United States Patent [19]

Morgan

[11] Patent Number: 5,099,796

[45] Date of Patent: Mar. 31, 1992

[54] KINETIC PERCH SYSTEM

[76] Inventor: James R. Morgan, 322 A School St., Califon, N.J. 07830

[21] Appl. No.: 705,705

[22] Filed: May 23, 1991

[51] Int. Cl.$^5$ ............................................. A01K 31/12
[52] U.S. Cl. .................................... 119/26; D30/119
[58] Field of Search ....................... 119/24, 25, 26, 29; D30/118, 119; D6/513; D21/242, 244, 245, 246; 248/318; 47/67; 182/196; 272/111, 112, 113

[56] References Cited

U.S. PATENT DOCUMENTS

| | | | |
|---|---|---|---|
| D. 214,572 | 7/1969 | Cohn | 272/112 |
| D. 261,454 | 10/1981 | Hobrecht | D6/513 |
| 2,707,936 | 5/1955 | Kiehl | 119/26 |
| 3,547,435 | 12/1970 | Scott | 272/112 |
| 4,116,433 | 9/1978 | Koerner | 272/112 |
| 4,153,286 | 5/1979 | Piper et al. | D6/513 X |
| 4,262,873 | 4/1981 | Prenger | 248/318 |
| 4,349,172 | 9/1982 | Banks, Jr. | 248/318 |

FOREIGN PATENT DOCUMENTS 1389732 4/1988 U.S.S.R. ............................... 119/26

OTHER PUBLICATIONS

Child Life Play Specialties, Inc., Catalog No. 21, Jun. 1979 p. 7.

Primary Examiner—Robert P. Swiatek
Assistant Examiner—Todd E. Manahan
Attorney, Agent, or Firm—Kenneth P. Glynn

[57] ABSTRACT

The system includes a cage which has at least two wall portions with an open lattice structure and with a plurality of flexible rope sections joined to one another at their first ends and connected to the cage itself at their second ends by connecting mechanisms. Joining mechanisms may be included for joining the first ends of said flexible rope sections. In another embodiment, the sytem of the present invention involves a cage with at least two wall portions of open lattice structure and at least one multiple perch-creating flexible rope. The rope has a first end and a second end with separate connecting mechanisms on each end and the flexible rope is connected at one end to a first location of the cage and is then woven in a back and forth manner to create a plurality of perch sections within the cage and, finally, the second end with the connecting mechanism is attached to yet a different location within the cage.

9 Claims, 2 Drawing Sheets

KINETIC PERCH SYSTEM

BACKGROUND OF THE INVENTION

1. Field of the Invention

The present invention is directed to perch systems for birds and other animals, and, more specifically, is directed to kinetic perch systems which create flexibility, different angling and different positions for multiple perch sections within a cage.

2. Prior Art Statement

People have kept rare and exotic birds as well as not so rare but attractive birds and other caged animal pets such as small primates, gerbils and other animals for centuries. Typically, the cages involve open lattice work such as wire, wood or, in this day and age, plastic. Perch systems have historically been in the form of pieces of tree branch, dowel sticks or other rods crossing a portion of the cage in a horizontal fashion. Other perches have taken the form of wire and wood or plastic trapeze type swings. The present invention, however, is directed to a totally different dynamic and kinetic perch system which allows the animal to change positions when perched, including location, angle of the perch, and, in some instances the different thicknesses of the perch itself.

SUMMARY OF THE INVENTION

The present invention involves a kinetic perch system for birds and other animals. In one embodiment, it includes a plurality of flexible rope sections with each section having a first end and a second end, with at least two of these rope sections having at least one knot therein located between the first end and the second end. Joining mechanisms are also included for joining the first ends of the flexible rope sections to one another. The joining mechanisms may actually be the ends of the ropes tied together, or may be a toroid or other device for joining the first ends of the plurality of flexible rope sections. Also included are separate connecting mechanisms located a each of the second ends of the plurality of flexible rope sections for connecting each of these second ends to different locations of a cage. The flexible rope may be a woven cord, a link chain or any other material which may be natural or synthetic. In another embodiment, the kinetic perch system includes a cage which has at least two wall portions with an open lattice structure and contained therein is the aforementioned plurality of flexible rope sections joined to one another at their first ends and connected to the cage itself at their second ends by the mentioned connecting mechanisms. In yet another embodiment to the kinetic perch system of the present invention involves a cage with at least two wall portions of open lattice structure and at least one multiple perch-creating flexible rope. The rope has a first end and a second end with separate connecting mechanisms on each end and the flexible rope is connected at one end to a first location of the cage and is then woven in a back and forth manner to create a plurality of perch sections within the cage and, finally, the second end with the connecting mechanism is attached to yet a different location within the cage. In this as well as all of the present invention kinetic perch systems, the flexible rope may be removed and reattached in different locations for the purpose of cleaning and/or relocating the perch sections for a change of environment for the bird or other animal.

BRIEF DESCRIPTION OF THE DRAWINGS

The present invention will be more fully understood when the specification herein is taken in conjunction with the drawings attached hereto. In those drawings, the following illustrations are presented.

DETAILED DESCRIPTION OF THE INVENTION

As mentioned in the prior art section, prior perch systems are basically in the form of pieces of wood, tree branches, or dowels or rods located in a cage. Such perches are used for birds, squirrels, gerbils, pet mice, and even caged primates of the smaller sizes. However, the difficulty with the prior art perches is that they are generally only horizontal, that they are rigid and have no flexibility for exercising the leg muscles of the animals, that they are of a single "feel", and that they cause certain types of rigidity in the musculation of the animals to set in, particularly in birds that perch hour after hour and day after day on the same horizontal wooden dowel of the same diameter.

The present invention, quite contrary to the prior art, involves the use of flexible rope which is generally advantageous to relieve fatigue o the animals feet and to allow the owner or user of a cage to have flexibility in laying out the perch itself to create multiple perch sections. Further, while the flexible rope of the present invention may be a chain rope, a synthetic rope or a woven natural material rope such 100% cotton, it may be easily removed so that it can be washed. In fact, in some embodiments, the present invention flexible rope may be a combination of synthetic and natural materials, such as a cotton rope having plastic or metal chain sections.

Further, the present invention in its preferred embodiments having a plurality of flexible ropes, utilizes at least three sections so as to allow for more variety of perch configurations.

Also, it is very possible for the user to simply reach into the cage and relocate one connecting mechanism to shift the height, position, and/or angle of the various sections within the kinetic perch design of the present invention. This not only changes the exercising capabilities of the perch for the pet but also relieves boredom that larger birds frequently suffer.

The connectors of the present invention are clips, or cut and threaded O-rings or any other quick attachment release mechanisms to facilitate the use of the present invention system by the user yet to assure that the pet will not remove the present invention kinetic perch system against the desires of the owner.

Finally, by use of a plurality of knots in a preferred embodiment present invention kinetic perch system, the pet will experience different thicknesses and feel within the perch sections to create both an interest for the pet as well as a change in the thickness of the perch, therefore effecting different muscle positions to the benefit of the pets physiology.

Figure 1:
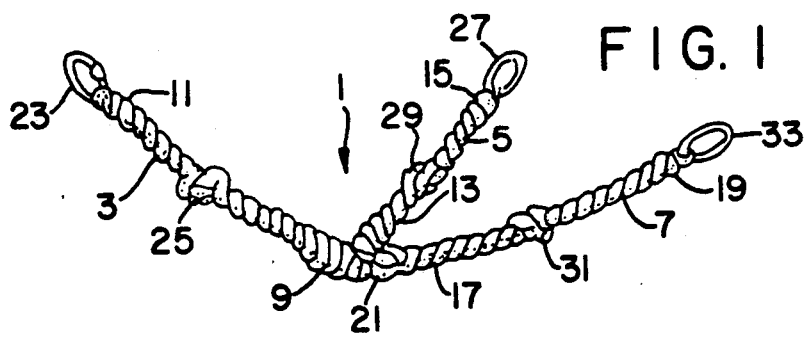
FIG. 1 shows a front view of a present invention kinetic perch system wherein the roping is tied to one another directly.

Referring now to FIG. 1, there is shown a front view of a present invention kinetic perch system 1 having a plurality of flexible rope sections 3, 5 and 7 constituting different perch sections. These ropes sections 3, 5 and 7 are shown having first ends 9, 13 and 17 respectively and second ends 11, 15 and 19 respectively. Knots 25, 29 and 31 are located as shown between the respective first and second ends of each rope section. Connecting mechanisms 23, 27 and 33 are shown and are either clip-on or cut 0-ring type connectors. Further, first ends 9, 13 and 17 are joined together by joining mechanisms 21, which, in this embodiment, constitutes the tieing or interweaving of the first ends 9, 13 and 17 to one another a shown.

The present invention kinetic perch system one shown in FIG. 1 may be attached to the lattice work of a cage so that the various rope sections are tense or loose and may all be connected at the same height or at different heights to create various angles of perch sections. Importantly, the connectors are not permanent but enable the system to be removably connected so that the various sections or the entire system maybe removed or relocated as desired.

Figure 2:
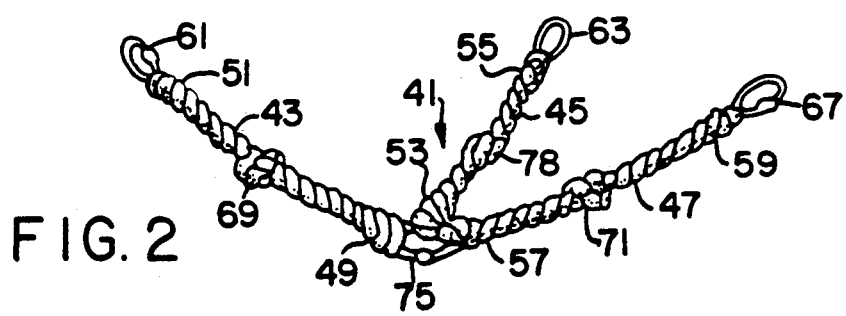
FIG. 2 shows a present invention perch system wherein a toroid is used to connect the plurality of flexible ropes.

FIG. 2 shows another front view of a present invention kinetic perch system 41 having flexible rope sections 43, 45 and 47. These rope sections 43, 45 and 47 have first ends 49, 53 and 57 respectively and second ends 51, 55 and 59 respectively. Knots 69, 71 and 78 are located as shown and connecting mechanisms 61, 63 and 67 are located at second ends 51, 55 and 59 respectively. First ends 49, 53 and 57 are joined together by being each separately tied to a toroidal ring 75 which may be plastic, wood or other material such as metal or ceramic, and the use of the toroid enables the user to branch the various rope sections off at any angles desired relative to one another while maintaining the toroid at the center of the perch sections.

Figure 3:
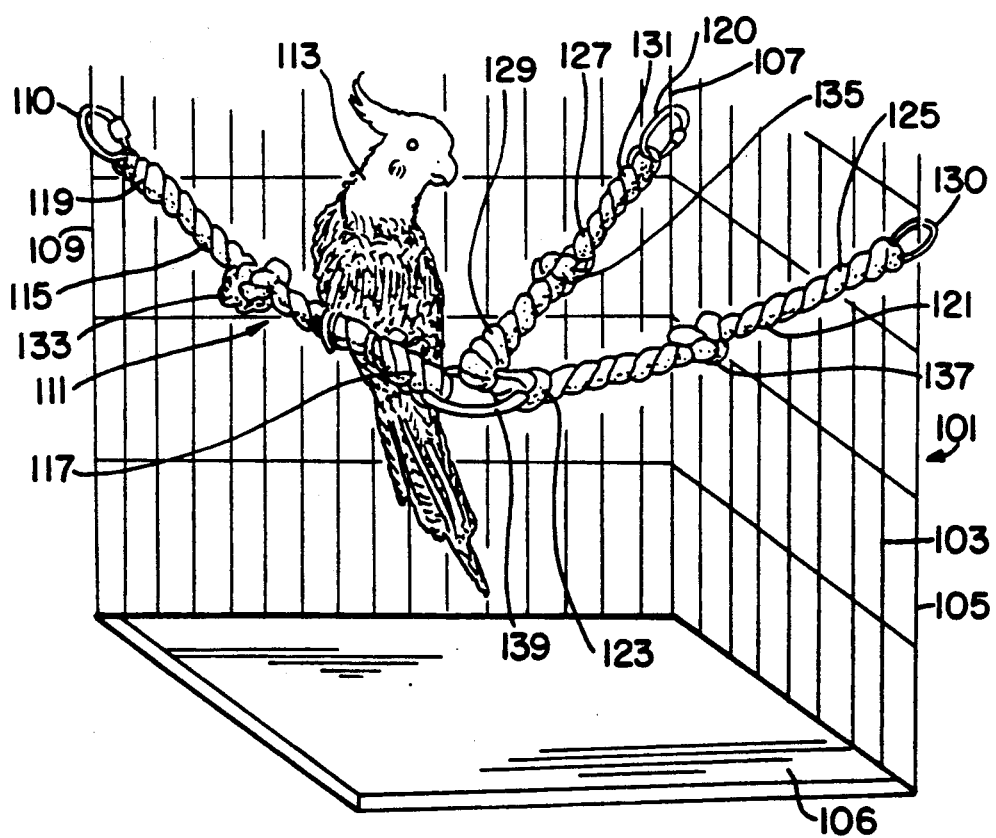
FIG. 3 shows a partial oblique view of a kinetic perch system which includes a cage and which shows a parrot located therein.

FIG. 3 shows a partial cut front oblique view of a kinetic perch system of the present invention 101 which includes cage 103 with bottom section 106 and open lattice work with corner vertical wires 105, 107 and 109. The device 111 includes flexible rope sections 115, 121 and 127. Perched on device 111 is parrot 113. Rope sections 115, 127 and 121 have first ends 117, 129 and 123 respectively and second ends 119, 131 and 125 respectively. Knots 133, 135 and 137 are located as shown. Second ends 119, 131 and 125 have connecting mechanisms 110, 120 and 130 as shown. These are respectively connected to end wires 109, 107 and 105. While in this particular representation they are connected to the corner wires, it should now be seen that they may be connected to any wiring within the cage open lattice structure.

First ends 117, 129 and 123 are joined to one another with joining mechanism 139 which, in this case, is a plastic ring.

While FIG. 3 shows device 111 connected by connecting mechanisms 110, 120 and 130 to corner wires 109, 107 and 105, it should be noted that the connecting mechanisms could be attached at any location on different or the same walls and at different or the same heights and with a very taught arrangement or a very loose arrangement to enable some swinging to occur. if desired.

Figure 4:
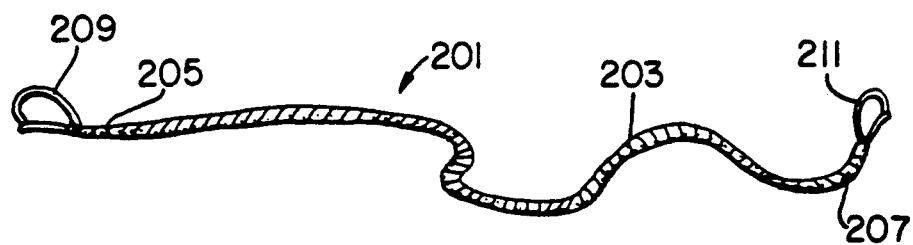
FIG. 4 shows a front view of a flexible rope utilized in yet another perch system of the present invention; and, FIG. 5 shows a partial oblique view of a parakeet cage with a flexible rope woven back and forth to create a kinetic perch system of the present invention.
Figure 5:
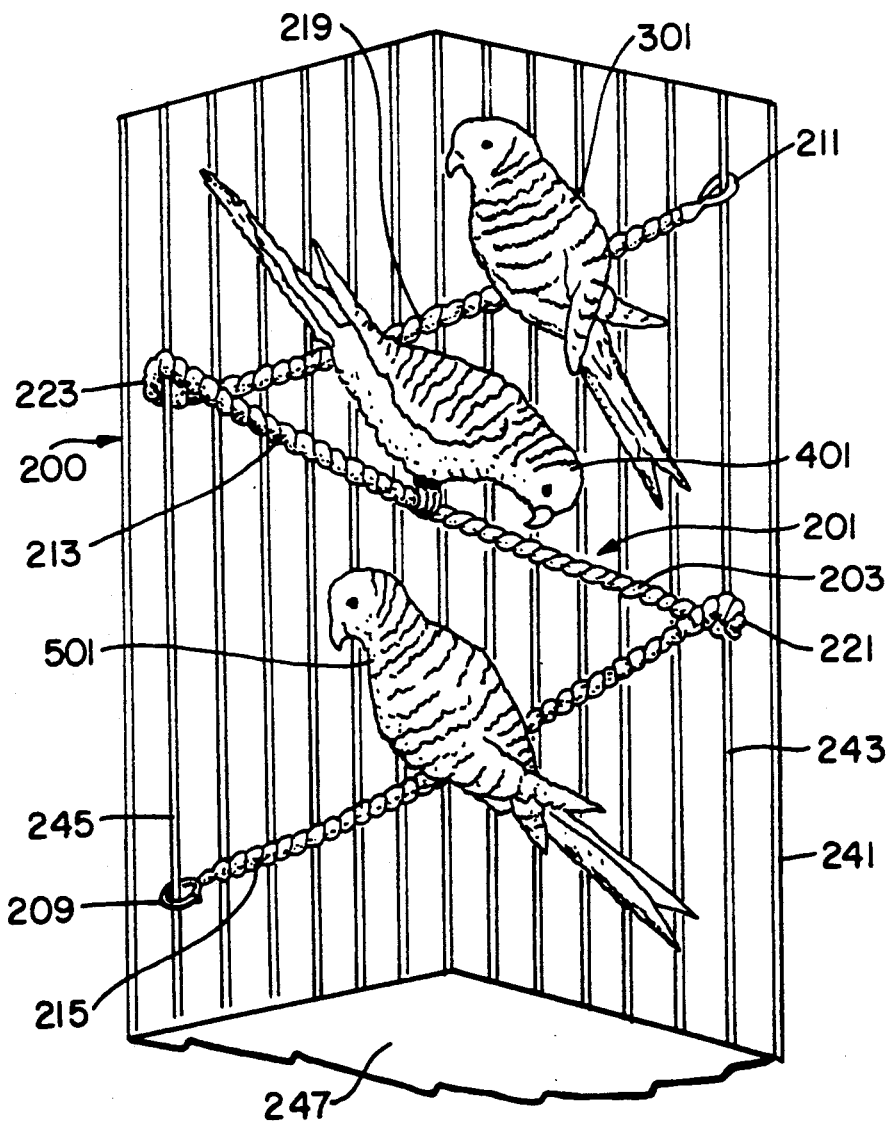

FIG. 4 shows a flexible cord 201 having a center section 203 and end sections 205 and 207. End sections 205 and 207 respectively have clips 209 and 211 attached thereto. Taking FIGS. 4 and 5 together, FIG. 5 shows a front partial oblique view of a parakeet cage with parakeets 301, 401 and 501 contained therein. FIG. 5 shows a present invention kinetic perch system shown generally as 200 and this includes cage 241 with an open lattice structure as shown and which includes bars 243 and 245 on opposite wall sections. Flexible cord 201 is clipped onto wire 243 with clip 211 and then is extended t form first perch section 219 and woven around wire 245 at point 223 to form a second perch section 213 with portion 203 of cord 201 being wove around wire 243 to form bend 221 and is further extended to form perch section 215 by being relatively tightly stretched and clipped with clip 209 to the bottom part of wire 245. This creates perch sections 219, 213 and 215 as shown. In other words flexible cord 201 is woven in a back and forth manner or fashion to create a plurality of perch sections as shown. While three such perch sections are created in this particular figure, it should be noted that any number of perch sections may be created, depending upon how far apart the back and forth weave is made, how long the flexible cord itself is and upon the relative size of the cage.

While the present invention described above includes cages which are shown to be entirely of open lattice, it is only necessary that two wall portions of a cage have open lattice so as to enable the flexible rope sections to be connected in a removable fashion to the cage. Obviously, such cages must have access to allow the user to install the flexible cord of the present invention kinetic perch system. Thus, the cage may be permanently installed such as a small primate cage, may be a portable cage, may be round or rectangular or square and may be made of plastic, metal, wood or cord or any other material including cast or formed plastic structures, without exceeding the scope of the present invention. Further, as mentioned, the cord may be of any available material although, in preferred embodiments, a woven or synthetic rope is preferred and washable materials such as cotton rope are also preferred.

Obviously, numerous modifications and variations of the present invention are possible in light of the above teachings. It is therefore understood that within the scope of the appended claims, the invention may be practiced otherwise than as specifically described herein.

What is claimed is:

1. A kinetic perch system for birds and other animals which comprises:
   (a) a cage being a full enclosure with an access and having at least two wall portions with an open lattice structure;
   (b) a plurality of flexible rope section, each section having a first end and a second end, at least two of such rope sections having at least one knot therein located between said first end and said second end;
   (c) a joining mechanism for joining said plurality of flexible rope sections to one another at their first ends; and,
   (d) separate connecting mechanisms located at each of the second ends of said plurality of flexible rope sections for connecting each of said second ends to different locations of said cage and being connected to said cage accordingly.

2. The kinetic perch system of claim 1 wherein said plurality of flexible rope sections comprises at least three such sections.

3. The kinetic perch system of claim 2 wherein said joining mechanism is the tieing of said first ends to one another.

4. The kinetic perch system of claim 1 wherein said joining mechanism is the tieing of said first ends to one another.

5. The kinetic perch system of claim 1 wherein said joining mechanism is a toroid.

6. The kinetic perch system of claim 5 wherein said toroid is a thin rope forming a loop to which each first end is joined.

7. The kinetic perch system of claim 1 wherein said flexible rope is a woven cord.

8. A kinetic perch system for birds and other animals, which comprises:

(a) a cage being a full enclosure with an access and having at least two wall portions with an open lattice structure;
(b) at least one multiple perch creating flexible rope, said rope having a first end and a second end;
(c) separate connecting mechanisms located a said first end and said second end for removably connecting said ends to said cage;

wherein one connecting mechanism is connected to the open lattice structure of the cage at a first location, said flexible rope extends from that first location to other locations of the open lattice structure in a back and forth woven fashion to create a plurality of perch sections, and the other connecting mechanism is connected to the open lattice structure at another location thereon, and whereby said flexible rope may be removed for cleaning and reconnected to said lattice structure in different locations to create new perch section arrangements and angles to make a change in the environment for birds and other animals.

9. The kinetic perch system of claim 8 wherein said flexible rope is a woven cord.

* * * * *